(12) United States Patent
Suzuki et al.

(10) Patent No.: US 6,233,986 B1
(45) Date of Patent: May 22, 2001

(54) STEERING LOCK APPARATUS

(75) Inventors: Noriyuki Suzuki; Sadato Kita, both of Aichi (JP)

(73) Assignee: Kabushiki Kaisha Tokai Rika Denki, Aichi (JP)

( * ) Notice: Subject to any disclaimer, the term of this patent is extended or adjusted under 35 U.S.C. 154(b) by 0 days.

(21) Appl. No.: 09/442,278

(22) Filed: Nov. 17, 1999

(30) Foreign Application Priority Data

Nov. 24, 1998 (JP) .................................................. 10-332566

(51) Int. Cl.[7] .................................................. B60R 25/02
(52) U.S. Cl. .................................. 70/186; 70/252; 464/57
(58) Field of Search .............................. 70/182–186, 252; 464/57

(56) References Cited

U.S. PATENT DOCUMENTS

| | | | | |
|---|---|---|---|---|
| 2,616,274 | * | 11/1952 | Landrum | 464/57 |
| 5,389,040 | * | 2/1995 | Kakimi | 464/57 |

FOREIGN PATENT DOCUMENTS

| | | | | |
|---|---|---|---|---|
| 3408514 | * | 6/1985 | (DE) | 70/252 |
| 2615892 | * | 12/1988 | (FR) | 70/252 |
| 0 844-154-A2 | | 5/1998 | (GB) . | |
| 0147942 | * | 9/1982 | (JP) | 70/252 |
| 0192640 | * | 11/1984 | (JP) | 70/252 |
| 0175543 | * | 7/1989 | (JP) | 70/252 |

* cited by examiner

Primary Examiner—Lloyd A. Gall
(74) Attorney, Agent, or Firm—Morgan, Lewis Bockius LLP

(57) ABSTRACT

An actuator portion 8 provided separately from an operating portion includes a lock member 13 for locking a steering shaft 9, a motor 18, and a lock control mechanism 34. The lock control mechanism 34 has a driven body 21 rotated by the motor 18 through a gear mechanism 43, a cam member 20 for moving the lock member 13, and an unlock spring member 27 constituted by a torsion coiled spring and disposed between the driven body 21 and the cam member 20. When the motor 18 is subjected to an unlocking operation in the condition that handle torque acts on the lock member 13, the spring force of the unlock spring member 27 is accumulated while the unlock spring member 27 absorbs the rotational displacement of the driven body 21.

4 Claims, 9 Drawing Sheets

STEERING LOCK APPARATUS

BACKGROUND OF INVENTION

1. Field of Invention

The present invention relates to a steering lock apparatus having an operating portion for carrying out locking and unlocking operations, and an actuator portion for locking and unlocking a steering shaft, in which the operating portion and the actuator portion are provided separately from each other.

2. Related Art

A steering lock apparatus was heretofore formed so that a portion of a key cylinder device operated by a key and a portion of a lock mechanism for locking a steering shaft were integrated with each other into one unit so as to be mechanically interlocked with each other.

The general structure of the steering lock apparatus was as follows. A cam member and a locking lever are provided between a key rotor of the key cylinder device and the portion of the lock mechanism for locking the steering shaft. The cam member rotates together with the key rotor. The cam member extends to the lock mechanism portion so as to be concentric with the key rotor. The locking lever operates in response to insertion and extraction of the key. Further, a lock member moved by the cam member is provided in the lock mechanism portion so as to be urged to move toward a lock position by a spring member.

In the aforementioned configuration, when the key inserted in the key rotor is located in an "ACC" position or in an "ON" position, the lock member is moved to an unlock position by the cam member and held in the unlock position by the locking lever. When the key is rotated from the "ACC" position to a "LOCK" position, the cam member's hold for the lock member is released by the rotation of the cam member. When the key is then extracted in the "LOCK" position, the locking lever's hold for the lock member is released. With the release of the locking lever's hold, the lock member is moved to a lock position by the urging force of the spring member. As a result, the lock member is fitted into a groove of the steering shaft, so that locking is performed.

When the extracted key is inserted in the key rotor in the "LOCK" position and then rotated to an operating position ("ACC", "ON" or "START" position), the lock member is moved to the unlock position against the spring force of the spring member by the cam member and held in the unlock position by the locking lever.

In the aforementioned configuration, however, the key cylinder device portion and the lock mechanism portion for locking the steering shaft were integrated with each other into one unit so as to be mechanically interlocked with each other. Accordingly, if the key cylinder device portion was provided on an instrument panel in front of a driver seat, restrictions might be placed on the strength and setting position of the lock mechanism portion because the lock mechanism portion was located in front of the driver's knees.

As a countermeasure to this problem, the following idea is considered. An operating portion operated by a key and an actuator portion such as a lock mechanism, or the like, may be separated from each other. When a lock member in the lock mechanism is moved to a lock position by a spring member and a key is inserted and rotated to the "ACC" position (that is, when steering is to be unlocked), this condition is detected, for example, by a detection means, or the like, so that a drive means such as a motor, or the like, is driven on the basis of the detection signal to move the lock member to an unlock position.

Incidentally, when so-called handle torque acts on the lock member in the condition that the lock member is fitted into the lock groove of the steering shaft, the degree of the aforementioned fitting may be severe so that the lock member may not move toward an unlock position at all though the motor is switched on. In this case, the lock member can come out of the lock groove if the motor is switched on again after a handle is moved slightly to release handle torque. There is, however, a disadvantage that the motor is locked first. Furthermore, there is a trouble that the motor must be started twice. There is a guess that this trouble leads to reduction of the life in use of the motor.

SUMMARY OF INVENTION

The present invention is designed in consideration of the aforementioned circumstances, and an object of the present invention is to provide a steering lock apparatus in which an operating portion and an actuator portion are provided separately from each other so that the degree of freedom in the arrangement of the operating portion and the actuator portion can be enhanced and in which a lock member can be operated without locking an electric drive means and without starting the electric drive means by a plurality of times even in the case where the lock member is made inoperative by handle torque when unlocking is performed.

In order to achieve the above object, according to an aspect of the present invention, there is provided a steering lock apparatus comprising:

an operating portion for carrying out locking and unlocking operations; and an actuator portion provided separately from the operating portion for locking and unlocking a steering shaft in connection with an operation of the operating portion;

the actuator portion including:

a lock member provided so as to be able to reciprocate between a lock position for locking the steering shaft and an unlock position for unlocking the steering shaft;

an electric drive means controlled in accordance with the operation of the operating portion; and a lock control mechanism having a driven body provided so as to be rotated reversibly by the electric drive means, a cam member provided so as to be able to rotate reversibly relative to the driven body, and an unlock spring member constituted by a torsion coiled spring provided between the driven body and the cam member, wherein: the cam member rotates reversibly in the same direction as the driven body through the unlock spring member on the basis of the reversible rotation of the driven body to thereby move the lock member to either one of the lock and unlock positions; and when the electric drive means is controlled by an unlocking operation in the condition that handle torque acts on the lock member located in the lock position, the lock control mechanism makes spring force of the unlock spring member accumulated with absorption of the rotational displacement of the driven body to thereby cause the spring force to act on the lock member to make the lock member move to the unlock position through the cam member.

With the aforementioned configuration, the operating portion and the actuator portion are separated from each other. Accordingly, the degree of freedom in the arrangement of the operating portion and the actuator portion is enhanced. For example, the operating portion can be arranged on an instrument panel and the actuator portion can be arranged in a foot portion in a driver seat.

When, for example, the operating portion in the aforementioned configuration is subjected to an unlocking operation in the condition that the lock member moves to the lock position to lock the steering shaft, the electric drive means makes an unlocking operation. In an ordinary state in which handle torque does not act on the lock member, the driven body, the unlock spring member and the cam member in the lock control mechanism are rotated in one direction by the unlocking operation of the electric drive means. As a result, the lock member is moved to an unlock position by the cam member, so that the steering shaft is unlocked.

When the operating portion is subjected to a locking operation in the condition that the steering shaft is unlocked, the electric drive means makes a locking operation. In this case, the driven body, the unlock spring member and the cam member in the lock control mechanism are rotated in a direction reverse to the aforementioned direction by the locking operation of the electric drive means. As a result, the lock member is moved to a lock position, so that the steering shaft is locked.

When handle torque acts on the lock member in the condition that the steering shaft is locked by the lock member, there is a possibility that the lock member cannot be moved from the lock position to the unlock position even in the case where the operating portion is subjected to an unlocking operation so that the electric drive means makes an unlocking operation. In this case, there is a fear that the electric drive means is locked.

In this respect, when the electric drive means in the aforementioned configuration is subjected to an unlocking operation in the condition that handle torque acts on the lock member located in the lock position, the electric drive means is not locked because the unlock spring member absorbs the rotational displacement of the driven body rotated by the electric drive means. In this case, the spring force of the unlock spring member is accumulated with the advance of the absorption of the rotational displacement of the driven body. The accumulated spring force acts on the lock member to make it move toward the unlock position through the cam member. Accordingly, when handle torque in this condition is released by a car driver, the lock member is moved to the unlock position through the cam member by the accumulated spring force of the unlock spring member.

Accordingly, the electric drive means is not locked even in the case where the lock member is made inoperative by the handle torque when unlocking is performed. Furthermore, the lock member can be moved to the unlock position by a simple means of driving the electric drive means once.

In the aforementioned configuration, each of the driven body and the cam member in the lock control mechanism makes a rotating motion. Furthermore, a torsion coiled spring is used as the unlock spring member disposed between the driven body and the cam member. Accordingly, there is an advantage that the space of arrangement can be made relatively small while not only the rotation stroke of the driven body and the cam member is made relatively large but also the accumulated spring force of the unlock spring member is made relatively large.

In the above steering lock apparatus according to the present invention, preferably, the electric drive means is constituted by an electric motor, and a gear mechanism constituted by a plurality of gears with their shafts substantially parallel with one another is provided between the motor and the driven body.

Further, preferably, there are provided a driven body damper for elastically receiving the driven body in each rotational position when the driven body rotates reversibly; and a cam damper for elastically receiving the cam member in each rotational position when the cam member rotates reversibly. In this case, the driven body damper and the cam damper may be integrated with each other.

DETAILED DESCRIPTION OF PREFERRED EMBODIMENTS

An embodiment of the present invention will be described below with reference to the drawings.

Figure 3:
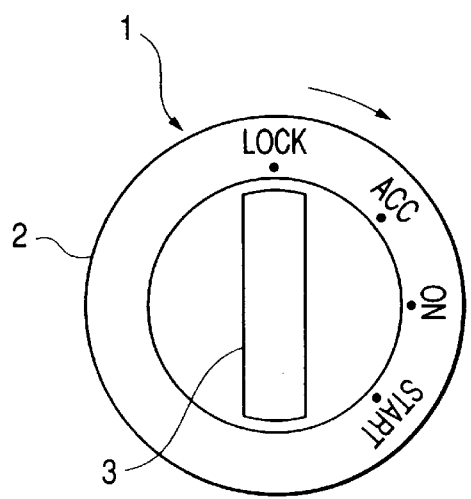
FIG. 3 is a front view of an operating portion.

Referring first to FIG. 3, an operating portion 1 is installed in an instrument panel in front of a driver seat of a car. The operating portion 1 includes a casing 2, and an operating knob 3 provided in the casing 2. The operating knob 3 is capable of being depressed and being rotated in the condition that the operating knob 3 is depressed. A knob switch 4 shown in FIG. 4 is provided in the inside of the casing 2.

Figure 4:
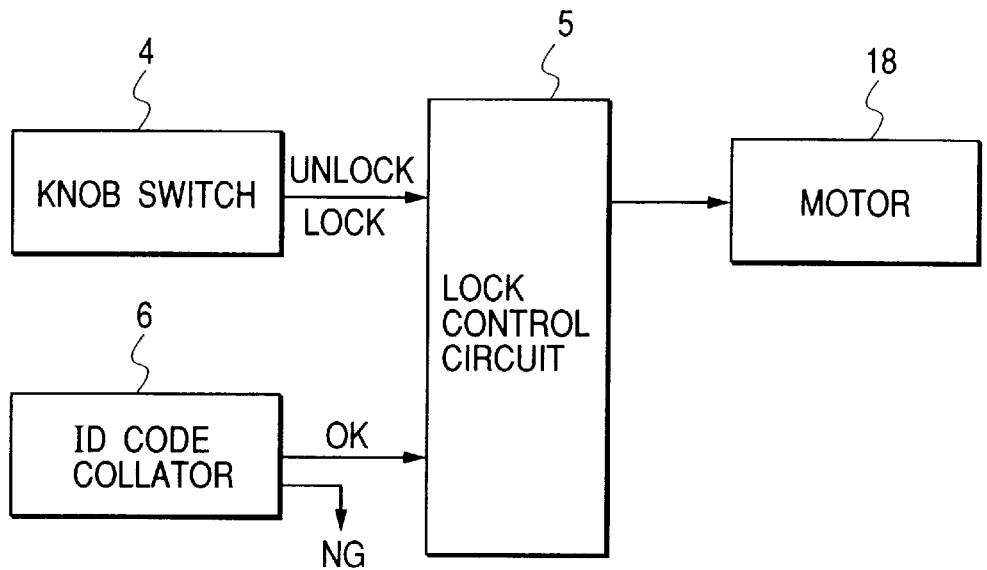
FIG. 4 is a block diagram showing an electrical configuration.

When the operating knob 3 is depressed in the condition that the operating knob 3 is located in the "LOCK" position, the knob switch 4 is turned on so as to supply an unlock signal to a lock control circuit 5 (see FIG. 4). When the operating knob 3 is released from the depressed state, the knob switch 4 is turned off so as to supply a lock signal to the lock control circuit 5. In the condition that the operating knob 3 is rotated to an operating position ("ACC", "ON" or "START" position) after the operating knob 3 is depressed in the "LOCK" position, the operating knob 3 is kept in the depressed state so that the knob switch 4 is kept in the "ON" state.

Though not shown, a rotational position detecting switch is further provided to detect the rotational position of the operating knob 3. The rotational position detecting switch supplies a detection signal to a control circuit provided in a vehicle body.

In FIG. 4, the lock control circuit 5 is provided to receive a signal from an ID code collator 6 provided in the vehicle body. The ID code collator 6 communicates with a communication device in a key or card owned by a driver to thereby collate ID codes. If the ID code of the key or card coincides with the previously stored ID code, the ID code collator 6 outputs an OK signal. If the ID code of the key or card does not coincide with the previously stored ID code, the ID code collator 6 outputs an NG signal.

Figure 1:
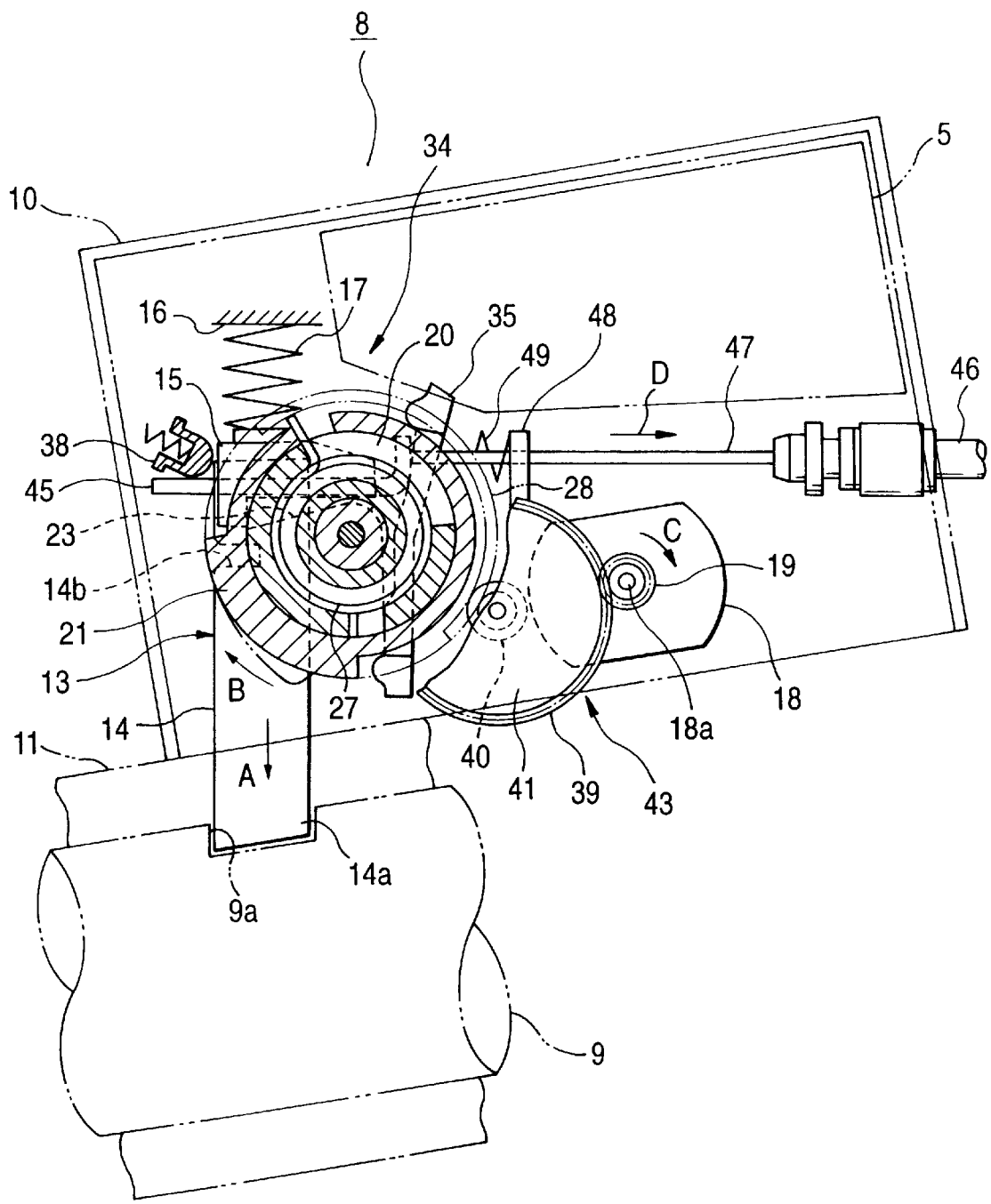
FIG. 1 is a partly cutaway front view of an actuator portion in a state in which a lock member has moved to a lock position, showing an embodiment of the present invention.
Figure 2:
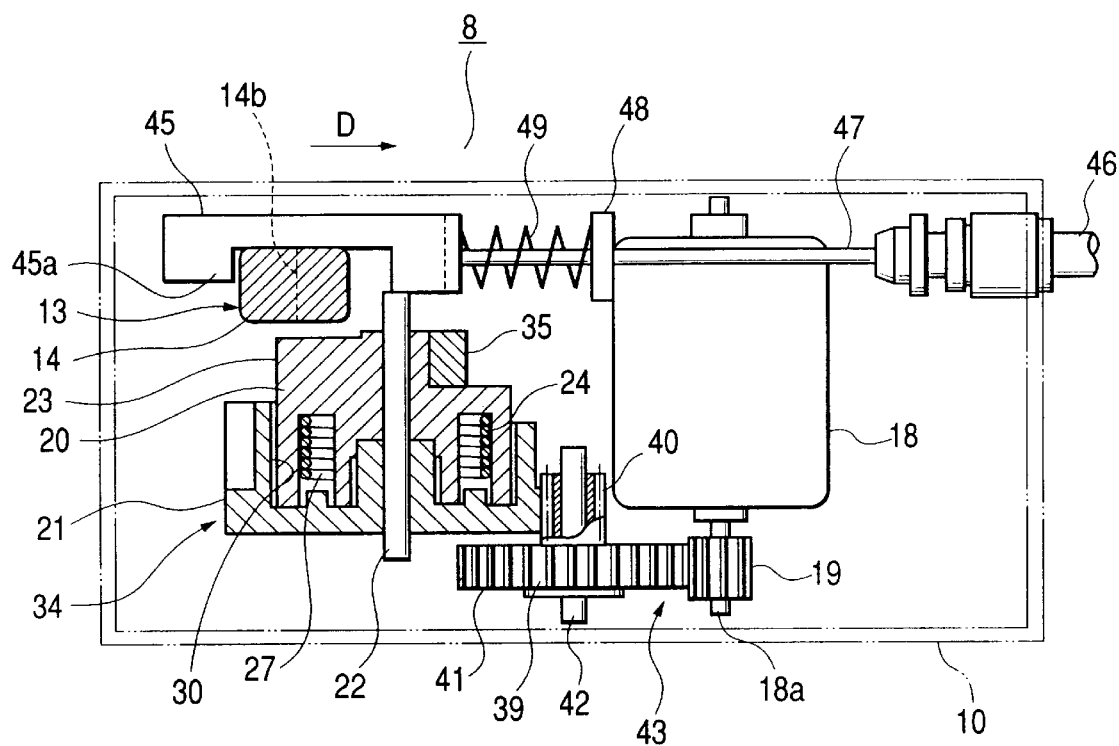
FIG. 2 is a cross-sectional plan view of the actuator portion.

On the other hand, an actuator portion 8 is shown in FIGS. 1 and 2. The actuator portion 8 is provided separately from the operating portion 1. The actuator portion 8 is provided in a suitable region near a steering shaft 9. A casing 10 of the actuator portion 8 is fixed to a steering column tube 11 which holds the steering shaft 9.

Figure 9:
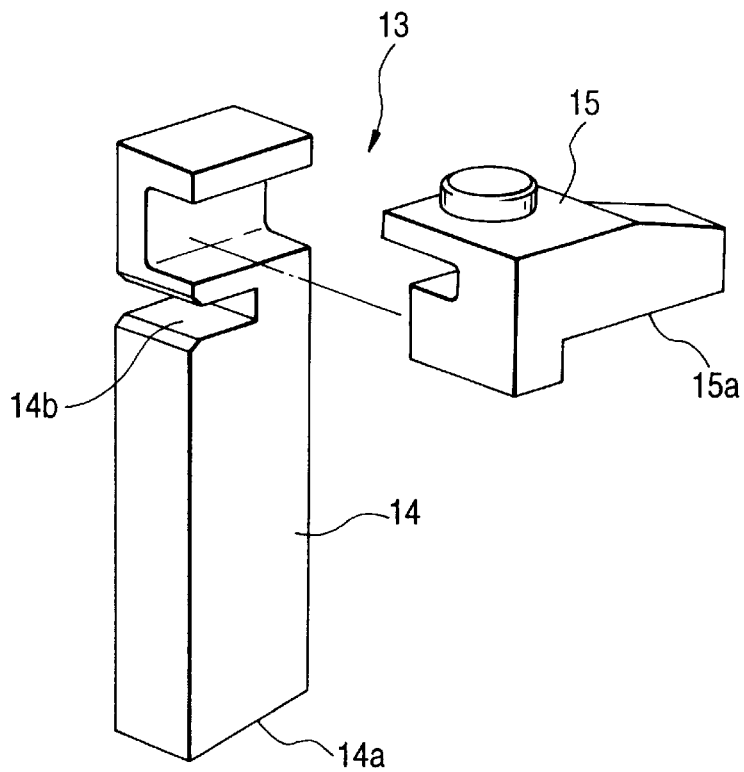
FIG. 9 is an exploded perspective view of the lock member.

A lock member 13 is disposed in the casing 10 so as to be movable in a direction crossing the axial direction of the steering shaft 9 (a vertical direction in FIG. 1). As shown in FIG. 9, the lock member 13 is constituted by a lock bar 14 shaped like a prism, and a lock stopper 15 fitted to an upper end portion of the lock bar 14 in FIG. 1. When a lower end portion 14a of the lock bar 14 is engaged with a lock groove 9a of the steering shaft 9, steering is locked. The lock member 13 is provided so as to reciprocate between a lock position in which the lower end portion 14a of the lock bar 14 is engaged with the lock groove 9a as shown in FIG. 1 and an unlock position in which the lower end portion 14a of the lock bar 14 is disengaged from the lock groove 9a.

The lock member 13 is urged to move toward the lock position in the direction of the arrow A in FIG. 1 by a spring member 17 which is constituted by a compression coiled spring provided between an upper surface of the lock stopper 15 and a spring bearing portion 16. An engagement groove 14b is formed in the left side portion of the lock bar 14 in FIGS. 1 and 9. On the other hand, a cam bearing portion 15a shaped like a hood is formed in the front side of the lock stopper 15.

A reversible motor 18 constituting an electric drive means is disposed in the casing 10 and on the right side of the lock member 13. A rotation shaft 18a of the motor 18 extents frontward. An output gear 19 is mounted on the rotation shaft 18a. Driving of the motor 18 is controlled by the lock control circuit 5. As will be described later, the motor 18 is rotated in a forward direction in an unlocking operation but rotated in a reverse direction in a locking operation.

In this case, the lock control circuit 5 controls driving of the motor 18 on the basis of the signal of the knob switch 4 in the condition that the lock control circuit 5 receives the OK signal from the ID code collator 6. When the lock control signal 5 does not receive the OK signal from the ID code collator 6, the lock control circuit 5 never drives the motor 18 even in the case where the signal of the knob switch 4 is supplied to the lock control circuit 5.

A cam member 20 and a driven body 21 are provided in front of the lock member 13 so as to be rotatable around a shaft 22 which pierces both the cam member 20 and the driven body 21. Incidentally, opposite end portions of the shaft 22 are supported by a gear casing not shown.

Figure 7:
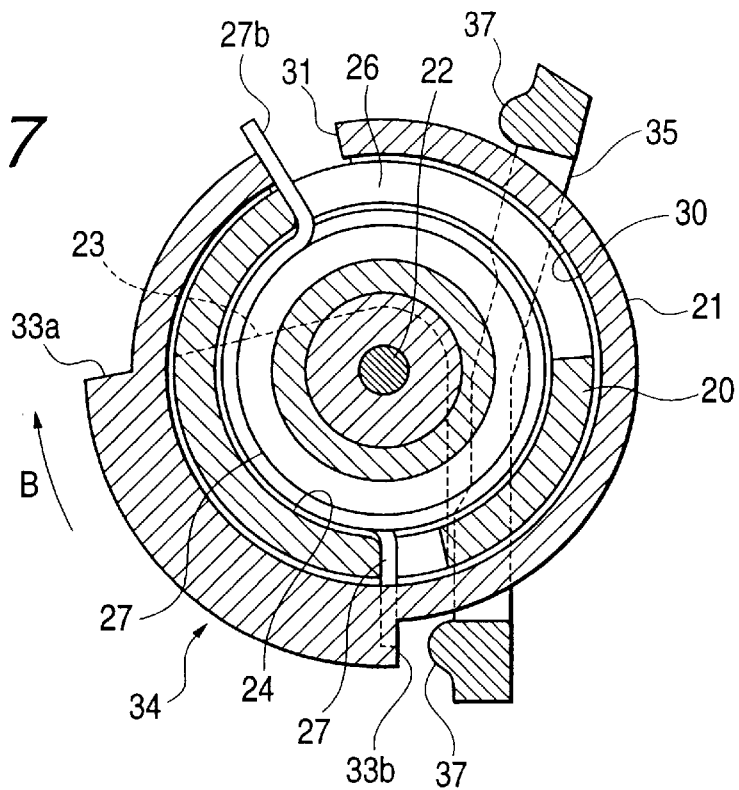
FIG. 7 is a vertical sectional front view of a lock control mechanism portion.
Figure 10:
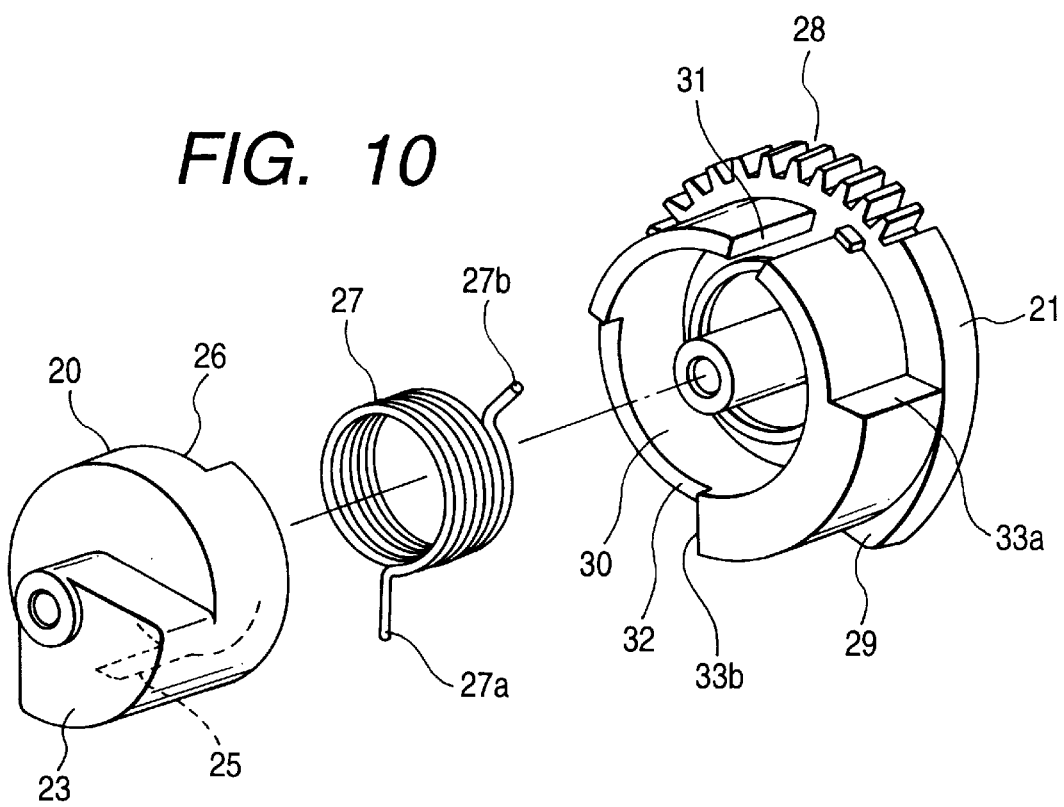
FIG. 10 is an exploded perspective view of the lock control mechanism.

AS shown in FIG. 10, the cam member 20 is circularly shaped. A cam portion 23 shaped like a sector is formed in a rear portion of the cam member 20 so as to protrude. As shown in FIGS. 2 and 7, a ring-like spring receiving portion 24 is formed on the front portion side of the cam member 20 so that the front side of the spring receiving portion 24 is opened. A spring hooking groove 25 and a cut portion 26 extending circumferentially are formed in a circumferential wall portion of the cam member 20. An unlock spring member 27 constituted by a torsion coiled spring is received in the spring receiving portion 24. The unlock spring member 27 has one end portion 27a inserted in the groove 25 so as to be hooked to the groove 25, and the other end portion 27b hooked to one end portion of the cut portion 26.

Figure 8:
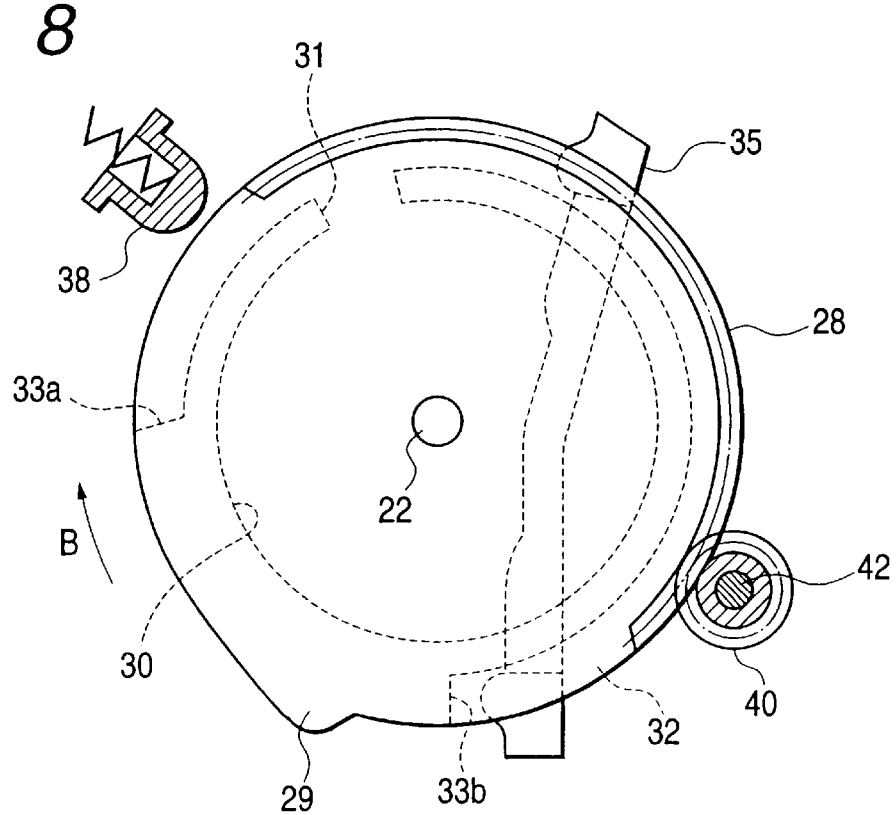
FIG. 8 is a front view of a driven body portion.

As shown in FIGS. 8 and 10, the driven body 21 is circularly shaped. A gear portion 28 and an engagement protrusion 29 are formed in the front outer circumferential portion of the driven body 21. A receiving portion 30 having the rear side opened is formed on the rear side of the driven body 21. A groove 31 and a cut portion 32 are formed in a circumferential wall portion of the driven body 21 so as to be displaced from the groove 25 and the cut portion 26 respectively. Step portions 33a and 33b are further formed in the outer circumferential portion of the circumferential wall portion of the driven body 21. The gear portion 28 is formed only in a region of about 180 degrees. The front portion of the cam member 20 having the unlock spring member 27 stored therein is received in the receiving portion 30 so that the cam member 20 can rotate. One end portion 27a of the unlock spring member 27 is hooked in one end portion of the cut portion 32, while the other end portion 27b of the unlock spring member 27 is inserted and hooked in the groove 31.

Figure 6:
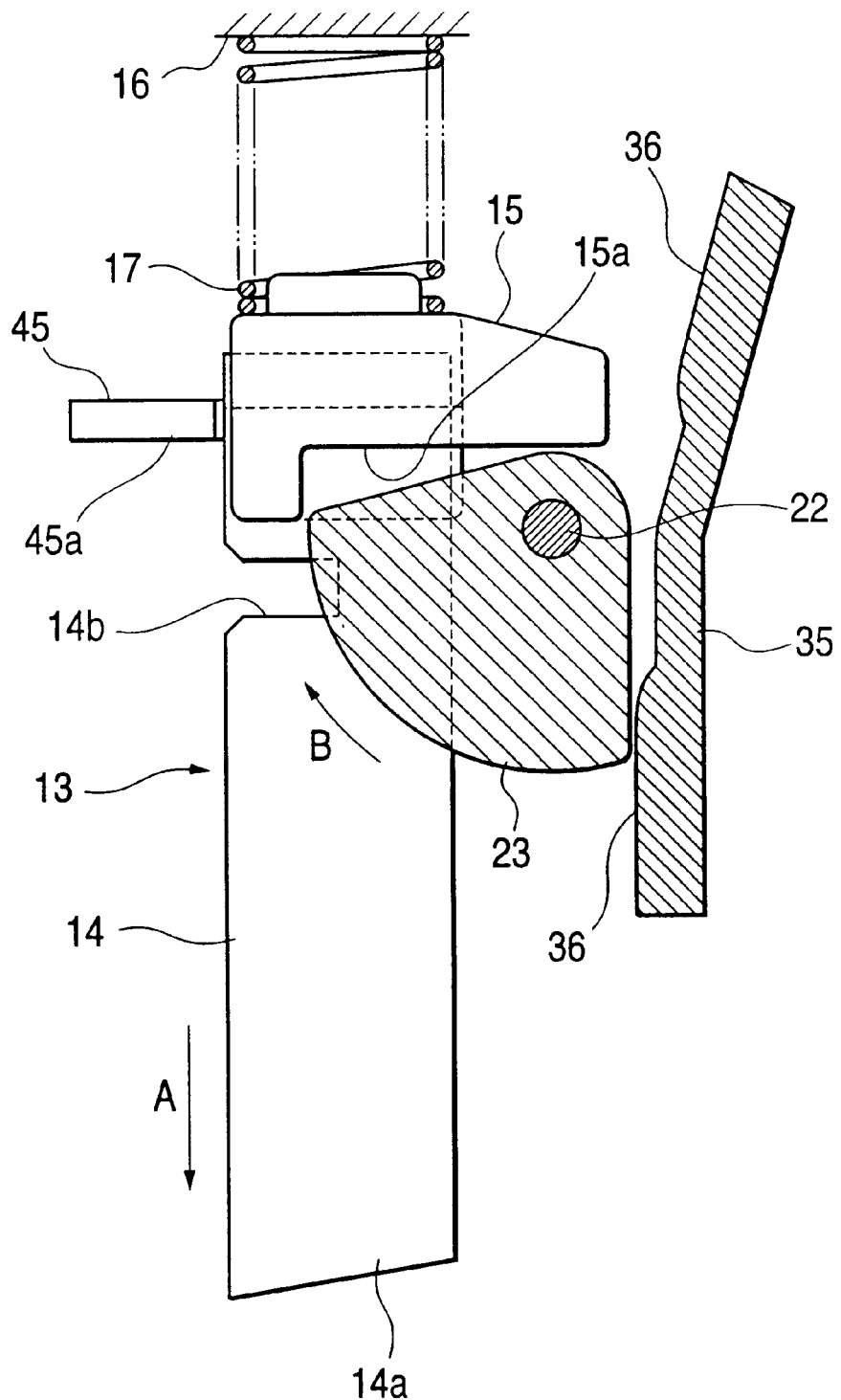
FIG. 6 is a vertical sectional front view of a combination of a lock member and a cam portion.

As shown in FIG. 6, the cam portion 23 of the cam member 20 is located so as to go under the cam bearing portion 15a of the lock stopper 15 in the lock member 13. In the condition that the cam portion 23 is located in the position shown in FIG. 6, the lock ember 13 is moved to the lock position by the spring force of the spring member 17. When the cam portion 23 is rotated in the direction of the arrow B in FIG. 6, the lock member 13 is moved in a direction reverse to the direction of the arrow A against the spring force of the spring member 17 through the cam bearing portion 15a by the cam portion 23. The cam member 20, the driven body 21 and the unlock spring member 27 form a lock control mechanism 34.

Figure 11:
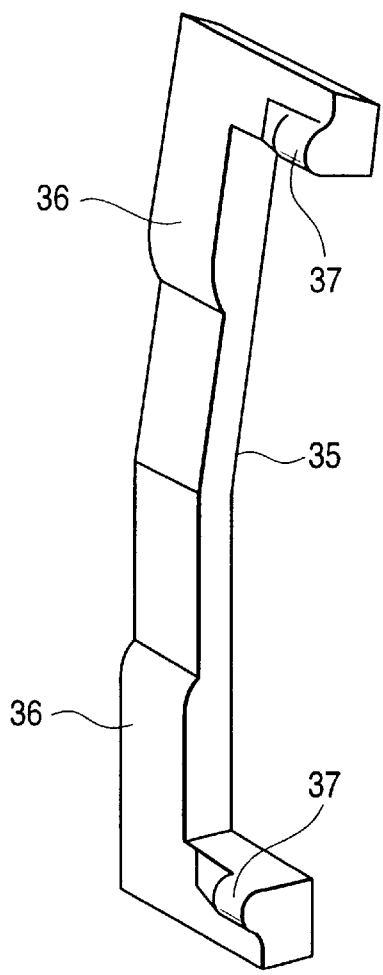
FIG. 11 is a perspective view of a damper member.

A damper member 35 is disposed in the right side of the cam portion 23. The damper member 35 is made of elastic rubber. As shown in FIG. 11, the damper member 35 has a pair of cam dampers 36 and 36 provided in its upper and lower portions respectively, and a pair of driven body dampers 37 and 37 provided so as to protrude forward from upper and lower end portions of the cam dampers 36 and 36 respectively. The cam dampers 36 and 36 and the driven body damper 37 and 37 are integrally formed with the damper member 35 so that the damper member 35 is U-shaped. The damper member 35 is positioned by a gear casing not shown. The cam dampers 36 and 36 are disposed in the right side of the cam portion 23. The driven body dampers 37 and 37 are disposed so as to be opposite to the outer circumferential portion of the driven body 21. A latch pin 38 (see FIGS. 1 and 8) is further provided so as to be located in a region corresponding to the locus of the movement of the engagement protrusion 29 in the driven body 21. The latch pin 38 is also provided in a gear casing not shown.

A relay gear 41 having a large gear 39 and a small gear 40 is provided between the output gear 19 and the driven body 21 so as to be rotatable through a shaft 42. Opposite end portions of the shaft 42 are also supported by a gear casing not shown. The large gear 39 in the front side of the relay gear 41 engages with the output gear 19. The small gear 40 in the rear side of the relay gear 41 engages with the gear portion 28 of the driven body 21.

Figure 5:
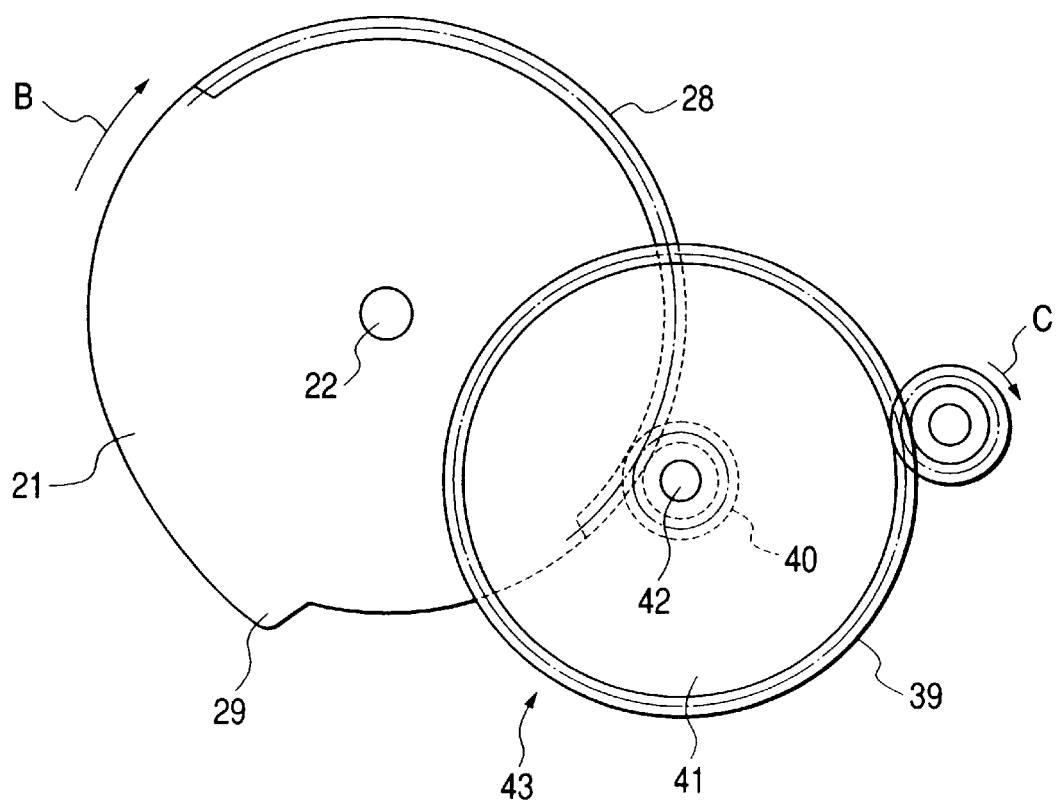
FIG. 5 is a front view of a gear mechanism portion.

The output gear 19, the relay gear 41 and the gear portion 28 of the driven body 21 form a gear mechanism 43. Each of the gears 19, 41 and 28 is constituted by a spur gear. The respective shafts 18a, 42 and 22 of the gears 19, 41 and 28 are parallel with one another. When the rotation shaft 18a of the motor 18 is rotated forward (in the direction of the arrow C in FIGS. 1 and 5), the rotation of the rotation shaft 18a is transmitted to the driven body 21 through the gear mechanism 43 while the rotational speed thereof is reduced. As a result, not only the driven body 21 is rotated in the direction of the arrow B but also the cam member 20 is rotated in the direction of the arrow B through the unlock spring member 27. When the rotation shaft 18a of the motor 18 is contrariwise rotated reversely (in a direction reverse to the direction of the arrow C in FIGS. 1 and 5), the rotation of the rotation shaft 18a is transmitted to the driven body 21 through the gear mechanism 43 while the rotational speed thereof is reduced. As a result, not only the driven body 21 is rotated in a direction reverse to the direction of the arrow B through the gear mechanism 43 but also the cam member 20 is rotated in the direction reverse to the direction of the arrow B through the unlock spring member 27.

A holding lever 45 is provided on the rear side of the lock member 13 so as to be slidable left and right in FIGS. 1 and 2. The holding lever 45 has a front end portion provided with an engagement portion 45a on the lock bar 14 side, and a base end portion connected to one end portion of an inner wire 47. The inner wire 47 forms a connection member of a cable 46. A compression coiled spring 49 is disposed between the base end portion of the holding lever 45 and a spring bearing portion 48. The other end portion of the inner wire 47 is connected to the operating knob 3. In the condition that the lock member 13 is moved to the lock position as shown in FIG. 1, the engagement portion 45a of the holding lever 45 is located above the engagement groove 14b of the lock bar 14 and faces a side of the lock bar 14.

Figure 12:
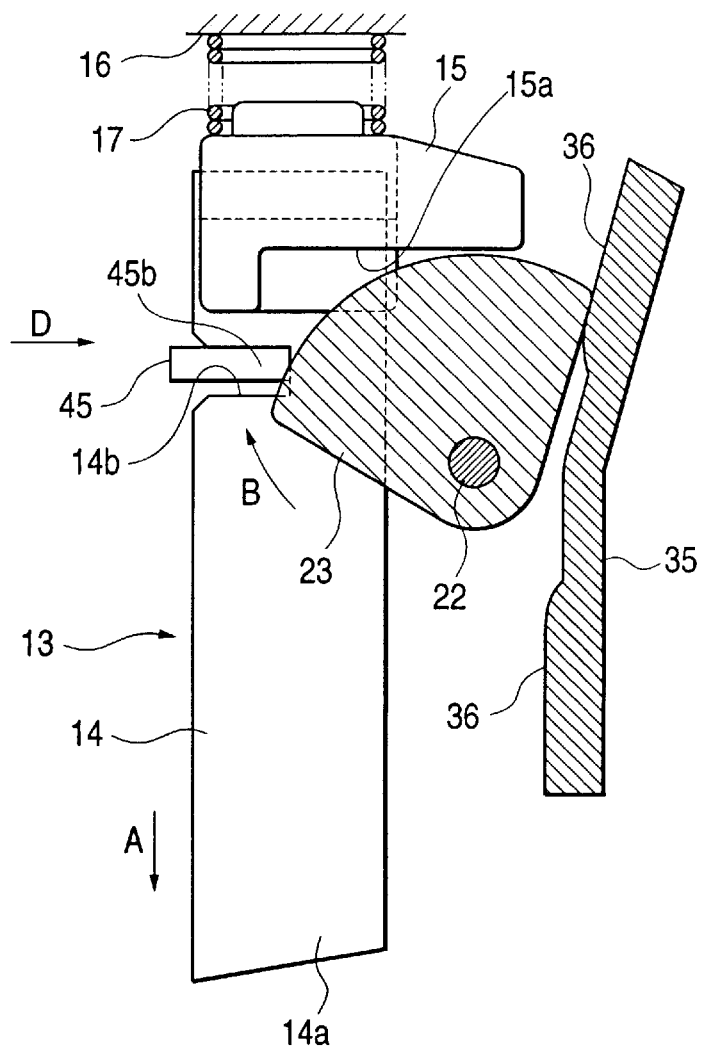
FIG. 12 is a view corresponding to FIG. 6 in a state in which the lock member has moved to the unlock position.

In this case, when the operating knob 3 is rotated from the "LOCK" position toward the "ACC" position in the condition that the lock member 13 is moved to the unlock position as shown in FIG. 12, the holding lever 45 is moved in the direction of the arrow D against the spring force of the compression coiled spring 49 through the inner wire 47. As a result, the engagement portion 45a of the holding lever 45 is fitted into and engaged with the engagement groove 14b of the lock bar 14 as shown in FIG. 12 so hat the lock member 13 is kept in the unlock position. When the operating knob 3 is contrariwise rotated from the "ACC" position toward the "LOCK" position, the holding lever 45 is moved in a direction reverse to the direction of the arrow D by the movement of the inner wire 47 in a direction reverse to the direction of the arrow D and the spring force of the compression coiled spring 49. As a result, the engagement portion 45a can come out of the engagement groove 14b.

Incidentally, the lock control circuit 5 is disposed in the casing 10 of the actuator portion 8 (see the two-dot chain line in FIG. 1).

The operation of the aforementioned configuration will be described below.

FIGS. 1 through 3 and FIGS. 6 through 8 show the condition that the operating knob 3 is located in the "LOCK" position and the lock member 13 is located in the lock position. In this condition, the lower end portion of the lock bar 14 is engaged with the lock groove 9a of the steering shaft 9 so that the steering shaft 9 is locked.

When a car driver pushes the operating knob 3 located in the "LOCK" position in this condition, the knob switch 4 is turned on so as to supply an unlock signal to the lock control circuit 5. Under the condition that an OK signal is received from the ID code collator 6 in advance, the lock control circuit 5 controls the motor 18 to perform an unlocking operation on the basis of the unlock signal given through the knob switch 4. As a result, the rotation shaft 18a of the motor 18 is rotated in the direction of the arrow C. Accordingly, the driven body 21 is rotated in the direction of the arrow B through the gear mechanism 43.

When the lock member 13 is in a locked state in which the lower end portion 14a of the lock bar 14 is engaged with the lock groove 9a of the steering shaft 9 and the lock member 13 is in an ordinary state in which handle torque does not act on the lock member 13, the cam member 20 is integrally rotated in the direction of the arrow B through the unlock spring member 27 with the rotation of the driven body 21 in the direction of the arrow B. As a result, the lock member 13 is moved in a direction reverse to the direction of the arrow A against the spring force of the spring member 17 by the cam portion 23, so that the lock member 13 reaches the unlock position as shown in FIG. 12. Accordingly, the lower end portion 14a of the lock bar 14 comes out of the lock groove 9a so that the steering shaft 9 is unlocked.

Figure 13:
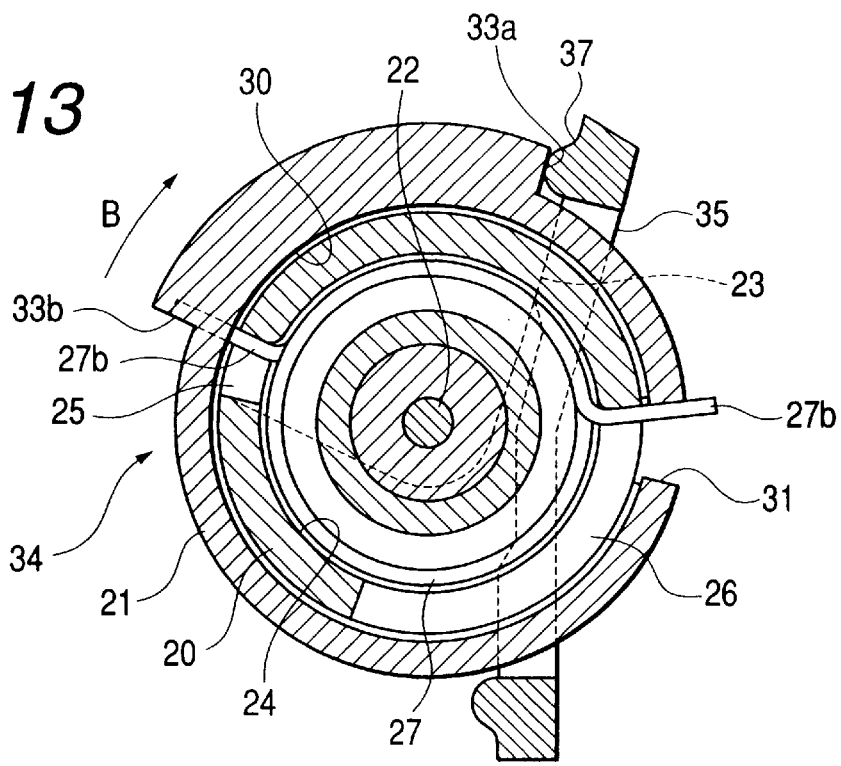
FIG. 13 is a view corresponding to FIG. 7 in the same state.
Figure 14:
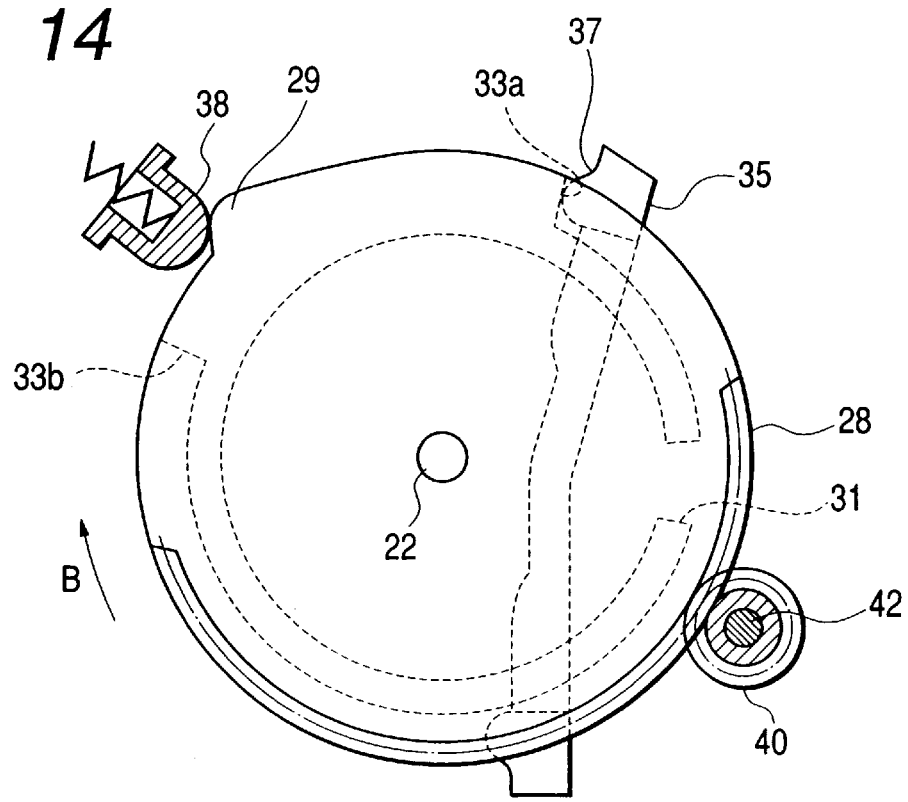
FIG. 14 is a view corresponding to FIG. 8 in the same state.

On this occasion, with the rotation of the driven body 21 in the direction of the arrow B, not only the latch pin 38 relatively climbs over the engagement protrusion 29 of the driven body 21 so as to engage with the engagement protrusion 29 as shown in FIG. 14 but also the step portion 33a of the driven body 21 is elastically caught by the driven body damper 37 in the upper side of the damper member 35 as shown in FIG. 13. Further, with the rotation of the cam member 20 in the direction of the arrow B, the end surface of the cam portion 23 is elastically caught by the cam damper 36 in the upper side as shown in FIG. 12. When the lock member 13 moves to the unlock position, the engagement groove 14b of the lock bar 14 faces the engagement portion 45a of the holding lever 45.

In this condition, when a car driver rotates the operating knob 3 clockwise (see the arrow in FIG. 3) from the "LOCK" position to an operating position (the "ACC" position or after the "ACC" position), the holding lever 45 is moved in the direction of the arrow D against the spring force of the compression coiled spring 49 through the inner wire 47 of the cable 46. As a result, the engagement portion 45a of the holding lever 45 is fitted into and engaged with the engagement groove 14b of the lock bar 14 so that the lock member 13 is kept in the unlock position as shown in FIG. 12.

When the operating knob 3 is rotated counterclockwise from the "ACC" position to the "LOCK" position, the holding lever 45 is moved in a direction reverse to the direction of the arrow D by the movement of the inner wire 47 in a direction reverse to the direction of the arrow D and the spring force of the compression coiled spring 49. As a result, the engagement portion 45a can come out of the engagement groove 14b. Accordingly, the lock member 13 is allowed to move in the direction of the arrow A.

When the force of pushing the operating knob 3 located in the "LOCK" position is released, the operating knob 3 is moved to a push-release position. With the movement of the operating knob 3 to the push-release position, the knob switch 4 is turned off so as to supply a lock signal to the lock control circuit 5. The lock control circuit 5 controls the motor 18 to perform a locking operation on the basis of the lock signal given through the knob switch 4. As a result, the rotation shaft 18a of the motor 18 is rotated in a direction reverse to the direction of the arrow C. Accordingly, the driven body 21 is rotated in a direction reverse to the direction of the arrow B through the gear mechanism 43.

With the rotation of the driven body 21 in the direction reverse to the direction of the arrow B, not only the engagement protrusion 29 climbs over the latch pin 38 so as to pass through the latch pin 38 but also the cam member 20 is rotated in a direction reverse to the direction of the arrow B through the unlock spring member 27. Accordingly, the pushing of the lock member 13 by the cam portion 23 is released, so that the lock member 13 is moved in the direction of the arrow A by the spring force of the spring member 17 and reaches the lock position as shown in FIGS. 1 and 6. As a result, the lower end portion 14a of the lock bar 14 is engaged with the lock groove 9a of the steering shaft 9 so that the steering shaft 9 is locked.

On this occasion, with the rotation of the driven body 21 in the direction reverse to the direction of the arrow B, the step portion 33b is elastically caught by the driven body damper 37 in the lower side of the damper member 35. Further, with the rotation of the cam member 20 in the direction reverse to the direction of the arrow B, the end surface of the cam portion 23 is elastically caught by the cam damper 36 in the lower side.

The case where handle torque acts on the lock member 13 in the locked state (see FIGS. 1 and 2 and FIGS. 6 through 8) in which the lower end portion 14a of the lock bar 14 is engaged with the lock groove 9a of the steering shaft 9 will be described below.

When the operating knob 3 located in the "LOCK" position in this condition is pushed so that the knob switch 4 is turned on so as to supply an unlock signal to the lock control circuit 5, the lock control circuit 5 controls the motor 18 to perform an unlocking operation. As a result, the rotation shaft 18a of the motor 18 is rotated in the direction of the arrow C. Accordingly, the driven body 21 is rotated in the direction of the arrow B through the gear mechanism 43.

Figure 15:
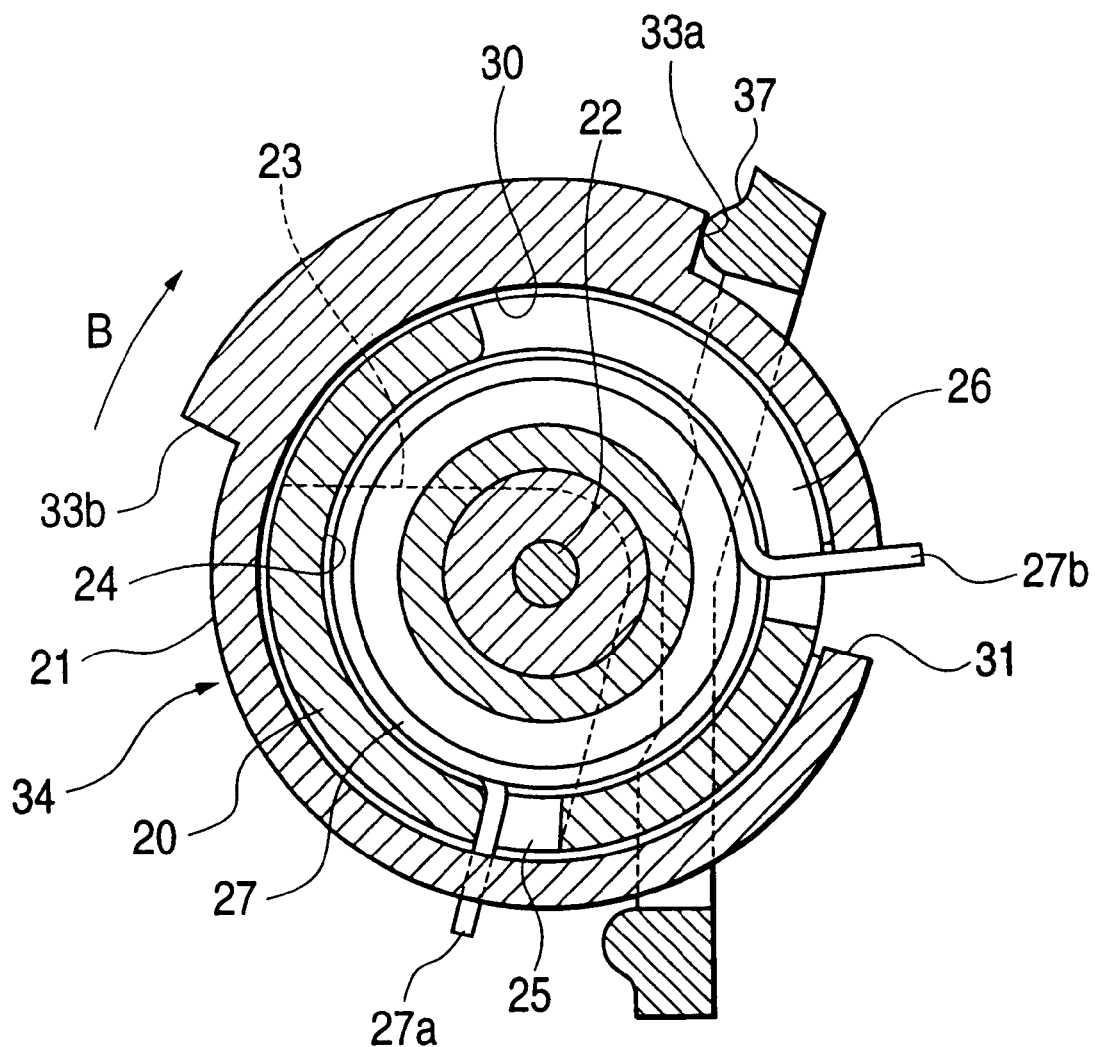
FIG. 15 is a view corresponding to FIG. 7 in a state in which the driven body has been rotated in the condition that handle torque acts on the lock member.

On this occasion, the cam member 20 is rotated (by about 15 degrees) in the direction of the arrow B through the unlock spring member 27 so that the end surface of the cam portion 23 abuts on the cam bearing portion 15a of the lock stopper 15. Since the aforementioned handle torque prevents the lock member 13 from moving, the cam member 20 is prevented from rotating any more. Accordingly, as shown in FIG. 15, only the driven body 21 is rotated continuously in the direction of the arrow B while the unlock spring member 27 is rolled tightly in the condition that the cam member 20 is left (on this occasion, the unlock spring member 27 is rotated in the direction of the arrow B in the condition that one end portion 27a of the unlock spring member 27 is engaged and fixed with the groove 25 of the cam member 20 while the other end portion 27b is engaged with the groove 31 of the driven body 21).

Accordingly, the unlock spring member 27 absorbs the rotational displacement of the driven body 21, so that the spring force of the unlock spring member 27 is accumulated. The spring force in this case acts on the cam member 20 to make it rotate in the direction of the arrow B and is set to be larger than the spring force of the spring member 17.

When the driven body 21 is rotated in the direction of the arrow B, the engagement protrusion 29 is engaged with the latch pin 38 in the same manner as in the aforementioned case (see FIG. 14). After the rotation of the motor 18 stops, the latch pin 38 prevents the driven body 21 from rotating in a direction reverse to the direction of the arrow B and prevents the spring force of the unlock spring member 27 from being released.

When the operating knob 3 is rotated from the "LOCK" position toward the "ACC" position, the holding lever 45 is pulled in the direction of the arrow D through the inner wire 47 of the cable 46. Since the engagement portion 45a of the holding lever 45 abuts on a side of the lock bar 14, however, the holding lever 45 cannot be moved in the direction of the arrow D any more. Accordingly, the operating knob 3 cannot be rotated to the "ACC" position.

When a car driver moves suitably a handle (steering wheel) (not shown) to release the aforementioned handle torque, the lock member 13 can move. Accordingly, the cam member 20 receiving the accumulated spring force of the unlock spring member 27 rotates in the direction of the arrow B to thereby push the lock member 13 up in a direction reverse to the direction of the arrow A against the spring force of the spring member 17 to move the lock member 13 to the unlock position (see FIGS. 12 and 13).

With the movement of the lock member 13 to the unlock position, the engagement groove 14b of the lock bar 14 faces the engagement portion 45a of the holding lever 45, so that the holding lever 45 is allowed to move in the direction of the arrow D. Accordingly, the operating knob 3 can be rotated from the "LOCK" position to an operating position (the "ACC position or after the "ACC position).

In this embodiment, the following effects can be obtained.

First, the operating portion 1 and the actuator portion 8 are separated from each other. Accordingly, the degree of freedom in the arrangement of the operating portion 1 and the actuator portion 8 is enhanced. For example, the operating portion 1 can be arranged in an instrument panel and the actuator portion 8 can be arranged in a foot portion in a driver seat. Accordingly, the effective space of the driver seat can be widened.

When the motor 18 is subjected to an unlocking operation in the condition that handle torque acts on the lock member 13 located in the lock position, the motor 18 is not locked because the unlock spring member 27 absorbs the rotational displacement of the driven body 21 rotated by the motor 18 through the gear mechanism 43. In this case, the spring force of the unlock spring member 27 is accumulated with the advance of the absorption of the rotational displacement of the driven body 21. The accumulated spring force acts on the lock member 13 to make it move toward the unlock position through the cam member 20. Accordingly, when handle torque is released by the car driver, the lock member 13 is moved to the unlock position by the spring force of the unlock spring member 27.

Accordingly, the motor 18 which is an electric drive means is not locked even in the case where the lock member 13 is made inoperative by the handle torque when unlocking is performed. Furthermore, the lock member 13 can be moved to the unlock position by a simple means of driving the motor 18 once.

In the lock control mechanism 34, both the driven body 21 and the cam member 20 rotate with the shaft 22 as a center. Furthermore, a torsion coiled spring is used as the unlock spring member 27 disposed between the driven body 21 and the cam member 20. Accordingly, there is an advantage that the space of arrangement can be made relatively small while not only the rotation stroke of the driven body 21 and the cam member 20 is made relatively large but also the accumulated spring force of the unlock spring member 27 is made relatively large.

Each of the members (the output gear 19, the relay gear 41, the driven body 21 and the cam member 20) between the motor 18 as an electric drive means and the lock member 13 is configured so as to rotate with its shaft as a center. Accordingly, there is an advantage that frictional resistance in the movement of each member can be reduced and, accordingly, the output of the motor 18 can be reduced compared with the case where sliding members are used.

A spur gear is used as each of the gears (the output gear 19, the relay gear 41 and the gear portion 28 of the driven body 21) constituting the gear mechanism 43 between the motor 18 and the driven body 21. Accordingly, there is an advantage that not only the gears can be prevented from gnawing at one another but also no special control for preventing the gears from gnawing at one another is required, compared with the case where worm gears are used.

The driven body dampers 37 are provided so as to elastically catch the driven body 21 in each of rotational positions of the driven body 21 when the driven body 21 rotates reciprocatingly. The cam dampers 36 are provided so as to elastically catch the cam member 20 in each of rotational positions of the cam member 20 when the cam member 20 rotates reciprocatingly. Accordingly, there is an advantage that not only impact caused by the rotation of the driven body 21 and the cammember 20 can be relaxed but also collision noise can be extremely prevented from producing.

Furthermore, the driven body dampers 37 and the cam dampers 36 are integrated into one damper member 35.

Accordingly, not only the number of parts can be reduced but also assembling can be performed easily.

The present invention is not limited to the aforementioned embodiment but can be modified or extended as follows.

A helical gear as well as the spur gear can be used as each of the gears constituting the gear mechanism 43.

A key cylinder device can be also used as the operating portion 1.

As means for holding the lock member 13 in the unlock position, the holding lever 45 moved through the inner wire 47 may be replaced by an electric drive means such as an electromagnetic solenoid.

The driven body dampers 37 and the cam dampers 36 may be provided as separate members.

According to the above description, the following effects can be obtained according to the present invention.

In the steering lock apparatus of the present invention, the operating portion and the actuator portion are separated from each other. Accordingly, the degree of freedom in the arrangement of the operating portion and the actuator portion can be enhanced. Further, the steering lock apparatus is configured so that the spring force of the unlock spring member is accumulated while the unlock spring member absorbs the rotational displacement of the driven body driven by an electric drive means so that the lock member is moved to the unlock position by the accumulated spring force even in the case where the lock member is made inoperative by handle torque when unlocking is performed. Accordingly, the electric drive means is not locked. Furthermore, the lock member can be moved to the unlock position by a simple means of driving the electric drive means once.

In addition, not only each of the driven body and the cam member in the lock control mechanism makes a rotating motion but also a torsion coiled spring is used as the unlock spring member disposed between the driven body and the cam member. Accordingly, there is an advantage that the space of arrangement can be made relatively small while not only the rotational stroke of the driven body and the cam member is made relatively large but also the accumulated spring force of the unlock spring member is made relatively large.

In the steering lock apparatus of the present invention, worm gears are not used as the gears constituting the gear mechanism between the driven body and the motor which is an electric drive means. Accordingly, there is an advantage that not only the gears can be prevented from gnawing at one another but also no special control for preventing the gears from gnawing at one another is required.

In the steering lock apparatus of the present invention, not only impact caused by the rotation of the driven body and the cam member can be relaxed but also collision noise can be extremely prevented from producing.

In the steering lock apparatus of the present invention, the driven body dampers and the cam dampers are integrated into one member. Accordingly, not only the number of parts can be reduced but also assembling can be performed easily.

What is claimed is:

1. A steering lock apparatus comprising:

an operating portion for carrying out locking and unlocking operations; and an actuator portion provided separately from said operating portion for locking and unlocking a steering shaft in connection with an operation of said operating portion, said actuator portion including:
 a lock member provided so as to be able to reciprocate between a lock position for locking said steering shaft and an unlock position for unlocking said steering shaft;
 an electric drive means controlled in accordance with the operation of said operating portion; and
 a lock control mechanism having a driven body provided so as to be rotated reversibly by said electric drive means, a cam member provided so as to be able to rotate reversibly relative to said driven body, and an unlock spring member constituted by a torsion coiled spring provided between said driven body and said cam member, wherein said cam member rotates reversibly in the same direction as said driven body through said unlock spring member on the basis of the reversible rotation of said driven body to thereby move said lock member to either one of said lock and unlock positions; and when said electric drive means is controlled by an unlocking operation in the condition that handle torque acts on said lock member located in said lock position, said lock control mechanism makes spring force of said unlock spring member accumulated with absorption of the rotational displacement of said driven body to thereby cause said spring force to act on said lock member to make said lock member move to said unlock position through said cam member.

2. A steering lock apparatus according to claim 1, wherein said electric drive means includes an electric motor; and further comprising:

a gear mechanism including a plurality of gears with their shafts substantially parallel with one another, said gear mechanism being provided between said motor and said driven body.

3. A steering lock apparatus according to claim 1, further comprising:

a driven body damper for elastically receiving said driven body in each rotational position when said driven body rotates reversibly; and a cam damper for elastically receiving said cam member in each rotational position when said cam member rotates reversibly.

4. A steering lock apparatus according to claim 3, wherein said driven body damper and said cam damper are integrated with each other.

* * * * *